(12) United States Patent
Santi

(10) Patent No.: US 7,196,277 B1
(45) Date of Patent: Mar. 27, 2007

(54) DEVICE AND APPARATUS FOR MEASURING THE LOAD IN A CHAMBER OF A VEHICLE

(76) Inventor: Larry D. Santi, 5045 NE. 23rd St., Renton, WA (US) 98059

( * ) Notice: Subject to any disclaimer, the term of this patent is extended or adjusted under 35 U.S.C. 154(b) by 0 days.

(21) Appl. No.: 11/291,260

(22) Filed: Dec. 1, 2005

(51) Int. Cl.
*G01G 19/08* (2006.01)

(52) U.S. Cl. .................. 177/136; 366/18; 702/174
(58) Field of Classification Search .............. 366/18; 177/136–141; 702/174
See application file for complete search history.

(56) References Cited

U.S. PATENT DOCUMENTS

| | | | |
|---|---|---|---|
| 3,373,829 A * | 3/1968 | Suman et al. | 177/132 |
| 3,938,673 A * | 2/1976 | Perry, Jr. | 414/21 |
| 4,651,838 A * | 3/1987 | Hamilton et al. | 177/209 |
| 4,775,275 A * | 10/1988 | Perry | 414/21 |
| 4,865,457 A * | 9/1989 | Strehlow | 366/18 |
| 5,133,212 A * | 7/1992 | Grills et al. | 73/296 |
| 5,391,843 A * | 2/1995 | Sato et al. | 177/141 |
| 5,521,827 A * | 5/1996 | Lindberg et al. | 701/124 |
| 5,610,372 A * | 3/1997 | Phillips et al. | 177/25.14 |
| 5,635,680 A * | 6/1997 | Dojan | 177/136 |
| 5,813,754 A * | 9/1998 | Williams | 366/6 |
| 5,850,757 A * | 12/1998 | Wierenga | 73/296 |
| 6,118,083 A | 9/2000 | Boyovich et al. | 177/136 |
| 7,072,763 B2 * | 7/2006 | Saxon et al. | 701/124 |
| 2005/0167165 A1* | 8/2005 | Takeda et al. | |

\* cited by examiner

*Primary Examiner*—Randy W. Gibson
(74) *Attorney, Agent, or Firm*—Seed IP Law Group PLLC

(57) ABSTRACT

A cement mixer truck and a weight measuring system is provided, comprising a mixing chamber, at least one rear roller bearing assembly, and a front mounting assembly. The rear roller bearing assembly includes a roller bearing and a first weight measurement device. The first measurement device can be configured to generate a first set of electrical signals corresponding to a load generated by the mixing chamber at the roller bearing. The front mounting assembly includes an engagement device and a second weight measurement device coupled to the engagement device. The second weight measurement device can be configured to generate a second set of electrical signals corresponding to a load generated by the mixing chamber at the engagement device. Means for electrically coupling the first and second weight measuring devices can calculate the weight of the chamber or the contents therein, or both.

9 Claims, 10 Drawing Sheets

DEVICE AND APPARATUS FOR MEASURING THE LOAD IN A CHAMBER OF A VEHICLE

BACKGROUND OF THE INVENTION

1. Field of the Invention

The present invention is directed toward a cement mixer truck, and more particularly toward a system and method for measuring the weight of the contents of a cement mixer truck.

2. Description of the Related Art

FIG. 1 is a schematic of a cement mixer truck 100 according to known art. The cement mixer truck 100 has a mixing chamber 110 (also referred to as a tub) that carries a load of cement or possibly other types of material with fluid-like qualities. Typically, a front mount 120 and a rear mount 130 rotatably support the mixing chamber 110 and its load. The front mount 120 may include rollers, gears, bearings and other structural units and/or drive mechanisms to support a portion of the weight of the mixing chamber 110 and load, and drive rotation of the mixing chamber 110. Additionally, the rear mount 130 may include rollers, gears, bearings and other structural and/or rotatable devices to support a remainder of the weight of the mixing chamber 110 and load and facilitate rotation of the mixing chamber 110.

The cement mixer truck 100 includes one weight measurement device (not shown). Typically, the front mount 120 includes the weight measurement device (i.e., scale). Although the weight measurement device can be calibrated to give a fairly accurate weight measurement when the mixing chamber 110 carries a predefined volume of material of a predefined density, the weight measurement becomes inaccurate as load material is either removed from or added to the mixing chamber 110. In fact, if for example the weight measurement device is calibrated to give a fairly accurate weight measurement when the mixing chamber 110 carries a full load, the weight measurement becomes increasingly more inaccurate as more and more load material is removed from the mixing chamber 110. In addition, if the mixing chamber 110 carries a load material of a density different from the predefined density used to calibrate the weight measurement device, the weight measurements generated by the weight measurement device will be inaccurate for at least one or more ranges of load volume of the mixing chamber 110. The errors will depend upon the extent that the density of the load material differs from the predefined load material density used to calibrate the weight measurement device.

The weight measurement inaccuracies exist because the cement mixer truck 100 has only one weight measurement device (typically installed as a part of the front mount 120) for making a force measurement, although the mixing chamber 110 has two or more positions of support (i.e., front and rear mounts 120 and 130) over which the weight is distributed. A weight measurement system having only one weight measurement device to measure the weight of the mixing chamber 110 and load supported at two or more positions yields an accurate weight measurement only if a position for the center of mass of the mixing chamber 110 and load is known. However, although the center of mass of the mixing chamber 110 and load may be known for a predefined load, the center of mass shifts as load material is either removed from or added to the predefined load. Thus, since the center of mass is unknown, the weight measurement device of the known art cannot produce an accurate weight measurement.

In order for the known art to produce an accurate weight measurement, the center of mass must be determined, which requires knowledge of the weight of the load, which is unknown.

FIG. 2 is a schematic of the mixing chamber 110 of FIG. 1 being acted upon by external forces. As illustrated, forces $F_1$ and $F_2$ applied by the front mount 120 and the rear mount 130, respectively, support the mixing chamber 110. However, since only one weight measurement device (not shown) is installed as part of the front mount 120, only $F_1$ will be measured. $F_2$ is not measured, and thus remains an unknown quantity. A reference coordinate system 202 is shown having an origin O. The front mount 120 is located at distance $x_1$ from the origin O, and the rear mount 130 is located a distance $x_2$ from the origin O. When the mixing chamber 110 contains a full load, the mixing chamber 110 and load is known to have a mass M, and the center of mass of the mixing chamber 110 and load is known to be located a distance $x_{cm}$ from the origin O. A gravitational force M·g acts upon the mixing chamber 110 and load at the center of mass $x_{cm}$. Since the mixing chamber 110 and load are static (i.e. at rest), the sum of all translational and rotational forces acting on the mixing chamber 110 and load must be zero. Equation (1) expresses that the net translational force acting on the mixing chamber 110 and load is zero, and equation (2) expresses that the net torque acting on the mixing chamber 110 and load with respect to the origin O is zero.

$$F_1 + F_2 = M \cdot g \tag{1}$$

$$F_1 \cdot x_1 + F_2 \cdot x_2 = M \cdot g \cdot x_{cm} \tag{2}$$

Now assume that a portion of the load has been removed, and an operator wishes to discover the remaining weight M·g of the mixing chamber 110 and load. As illustrated, $F'_1$ and $F'_2$ are the new forces applied to the mixing chamber 110 by the front mount 120 and rear mount 130, respectively, and the center of mass has shifted to $x'_{cm}$ measured with respect to the origin O. One replaces $F_1$, $F_2$, M and $x_{cm}$ of equations (1) and (2) with $F'_1$, $F'_2$, M' and $x'_{cm}$, and simultaneously solves equations (1) and (2) for M' (eliminating the unknown force $F'_2$), obtaining $$M' = [F'_1/g] \cdot [(x_2 - x_1)/(x_2 - x'_{cm})] \tag{3}$$

Equation (3) generates an accurate value for M' as long as the center of mass location $x'_{cm}$ is known. However, $x'_{cm}$ is not known. The method as practiced by the known art substitutes $x_{cm}$ for $x'_{cm}$ in equation (3) to obtain an estimate for M'. Thus, the mass M' computed by equation (3) will be larger than the true mass of the mixing chamber 110 and new load. (The mass M' computed by equation (3) may also be smaller than the true mass, depending upon the value of $x'_{cm}$). By using only one force measurement taken at one support position of the mixing chamber 110 (when the mixing chamber 110 is supported at two or more support positions), an inaccurate value for the mass, and hence weight, of the mixing chamber 110 and load is generated.

What is needed is a system and method for accurately determining the mass and weight of a cement mixer at all load volumes.

BRIEF SUMMARY OF THE INVENTION

According to one embodiment, the present invention provides a cement mixer truck, comprising a mixing chamber, at least one rear roller bearing assembly, and a front mounting assembly. The rear roller bearing assembly includes a roller bearing, configured to rotatably support the mixing chamber, and a first weight measurement device coupled to the roller bearing. The first weight measurement device can be configured to generate a first set of electrical signals corresponding to a load borne by the roller bearing and generated by the mixing chamber. The front mounting assembly includes an engagement device, rotatably coupled to the mixing chamber, and a second weight measurement device coupled to the engagement device. The second weight measurement device can be configured to generate a second set of electrical signals corresponding to a load borne by the engagement device and generated by the mixing chamber.

In accordance with another embodiment, the present invention provides a weight measuring system having a chamber, an engagement device, a first and a second weight measuring device, and means for electrically coupling the first and second weight measuring devices. The chamber can have a first end and a second end, and be operable to receive, store, and deposit a load. The engagement device is adapted to rotatably receive the first end of the chamber. The first weight measuring device can be adapted to removably couple to the engagement device and is operable to measure the weight of the first end of the chamber. The second weight measuring device can be adapted to rotatably receive the second end of the chamber and is operable to measure the weight of the second end of the chamber. The means for electrically coupling the first weight measuring device to the second weight measuring device is operable to calculate the weight of the load.

In yet another embodiment of the present invention, a method is provided for measuring a weight of a load in a chamber of a vehicle, comprising measuring a weight of a first end and a weight of a second end of the chamber. The method further includes determining a distance from a fixed reference point to a center of mass of the load, by means of the weight of the first end, the weight of the second end, and an axial distance from the first end and the second end, respectively, to the fixed reference point. The method also includes calculating a weight of the load from a cumulative weight of the first end and the second end, and the distance from the fixed reference point to the center of mass of the load.

DETAILED DESCRIPTION OF THE INVENTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures and components associated with devices including, but not limited to, decoders and display devices have not been shown or described in detail to avoid unnecessarily obscuring descriptions of the embodiments.

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Reference throughout this specification to "weight measuring device", "load cell", "load cell pin", "load cell plate", or "scale" is not intended in a limiting sense, but is rather intended to refer to any device operable to measure a mass or a weight of an object or to measure a magnitude of an applied force.

Reference throughout this specification to "truck", "cement mixer truck", or "vehicle" is not intended in a limiting sense, but is rather intended to refer to any vehicle, mechanism, or support device or platform operable to carry a load or to support other structure or enclosure, which can carry a load.

Reference throughout this specification to "mixing chamber" or "chamber" is not intended in a limiting sense, but is rather intended to refer to any structure that is operable to receive, store, and/or deposit or dispense a load.

Figure 1:
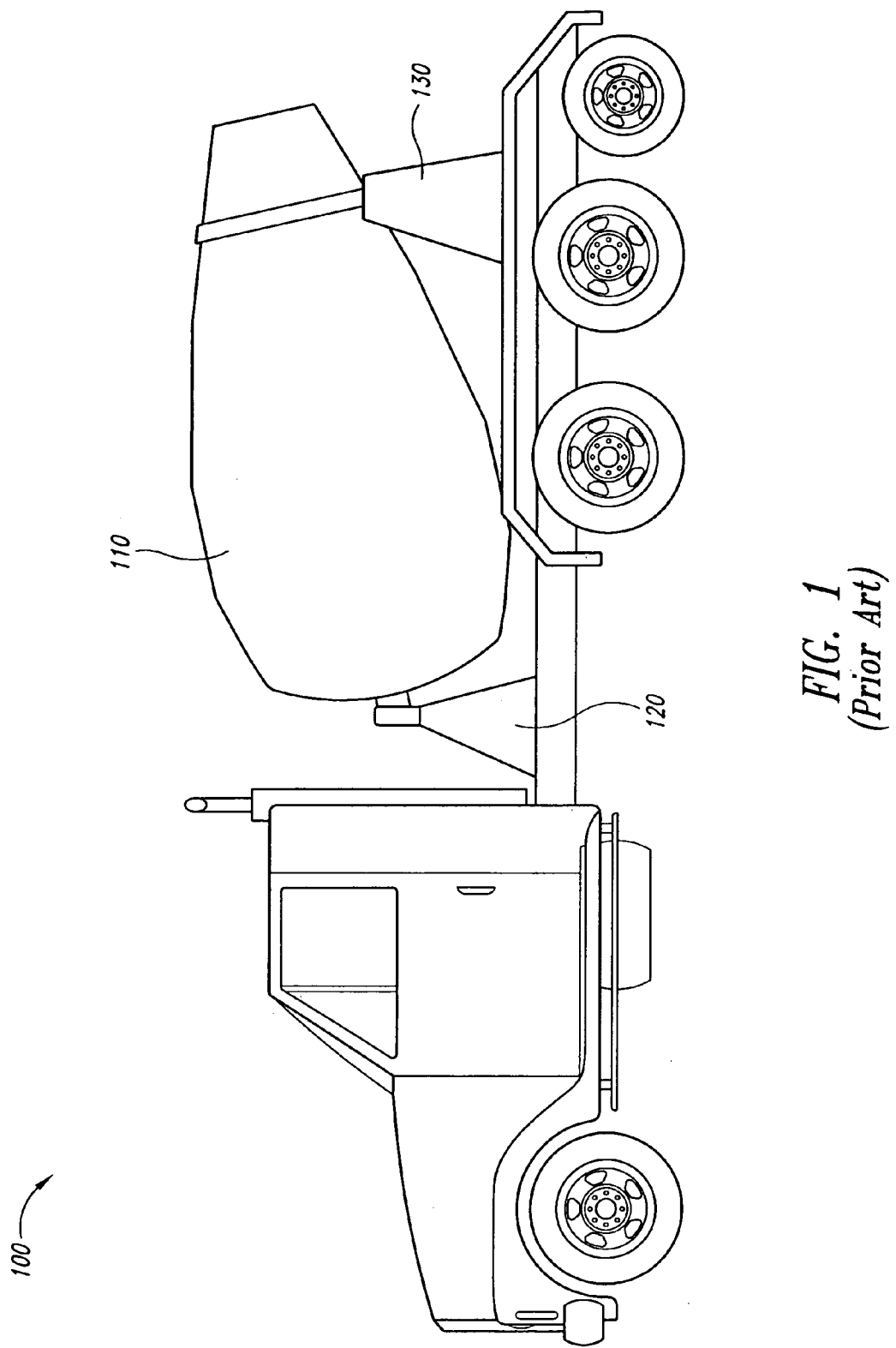
FIG. 1 is a schematic of a cement mixer truck, according to known art.
Figure 2:
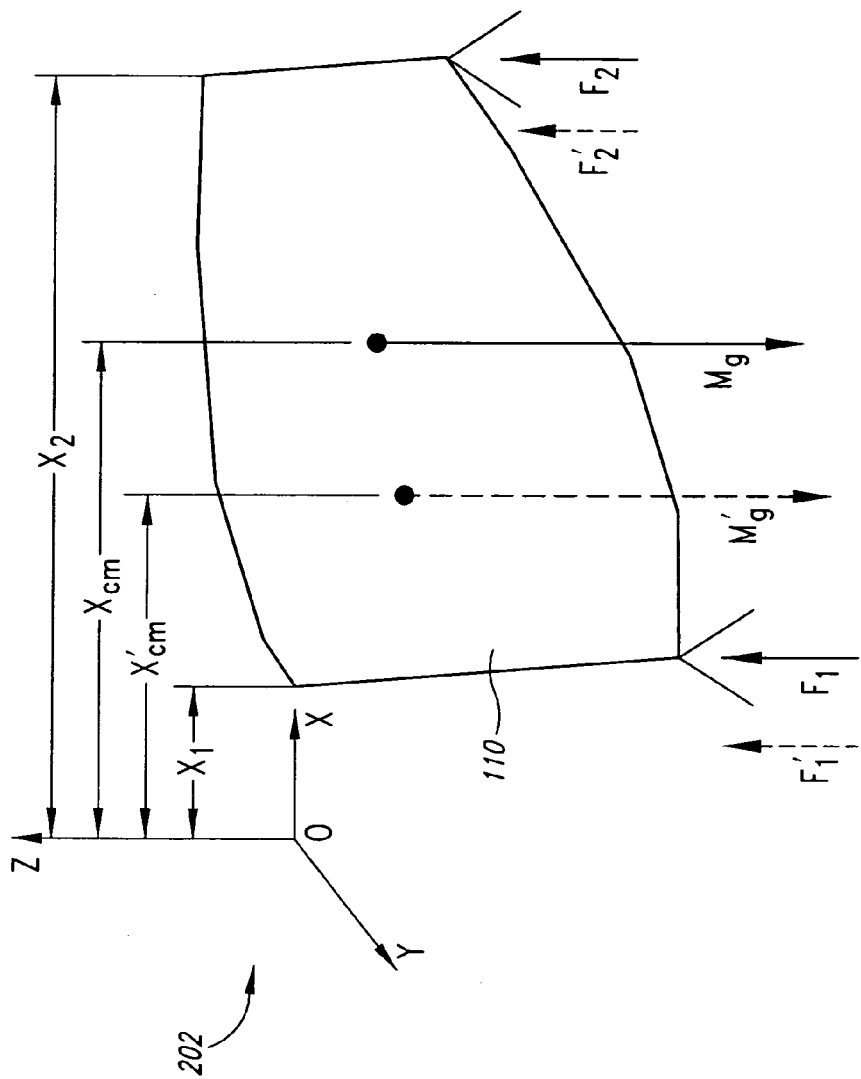
FIG. 2 is a schematic of the mixing chamber of the cement mixer truck of FIG. 1.
Figure 3:
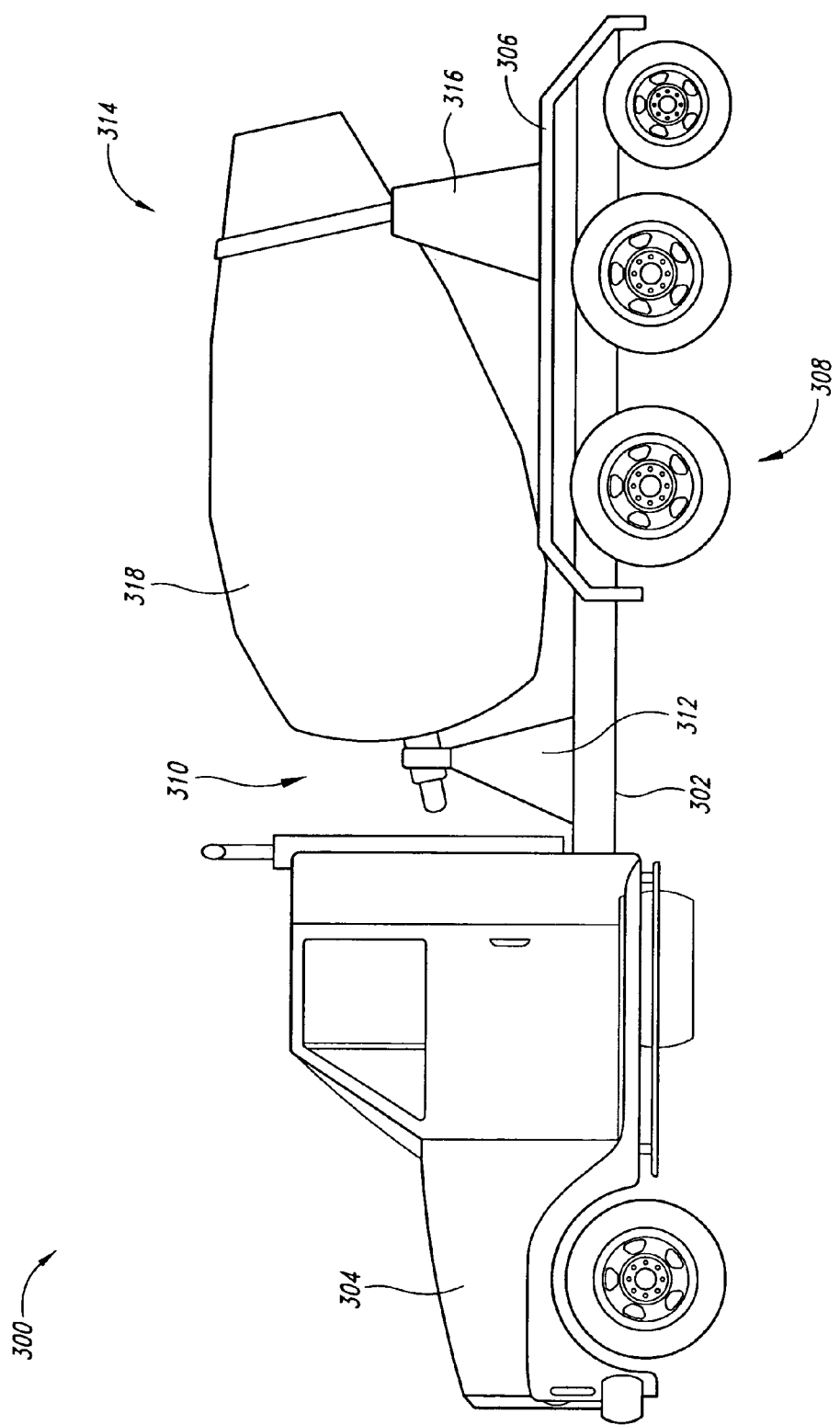
FIG. 3 is a schematic of a side view of a cement mixer truck, according to an embodiment of the invention.

FIG. 3 is a schematic side view of a cement mixer truck 300 in accordance with an embodiment of the invention. The cement mixer truck 300 includes a frame 302 that is removably coupled to a cab 304. The cement mixer truck 300 includes a platform 306 and a wheel assembly 308 mounted to the frame 302. The wheel assembly 308 includes axles, bearings, wheels, tires, brakes, and all other supporting structures that are known by one of skill in the art. Additionally, the cement mixer truck 300 includes a forward portion 310 having a forward mounting assembly 312 and a rear portion 314 having a rear mounting assembly 316 for rotatably mounting a mixing chamber 318.

Figure 4:
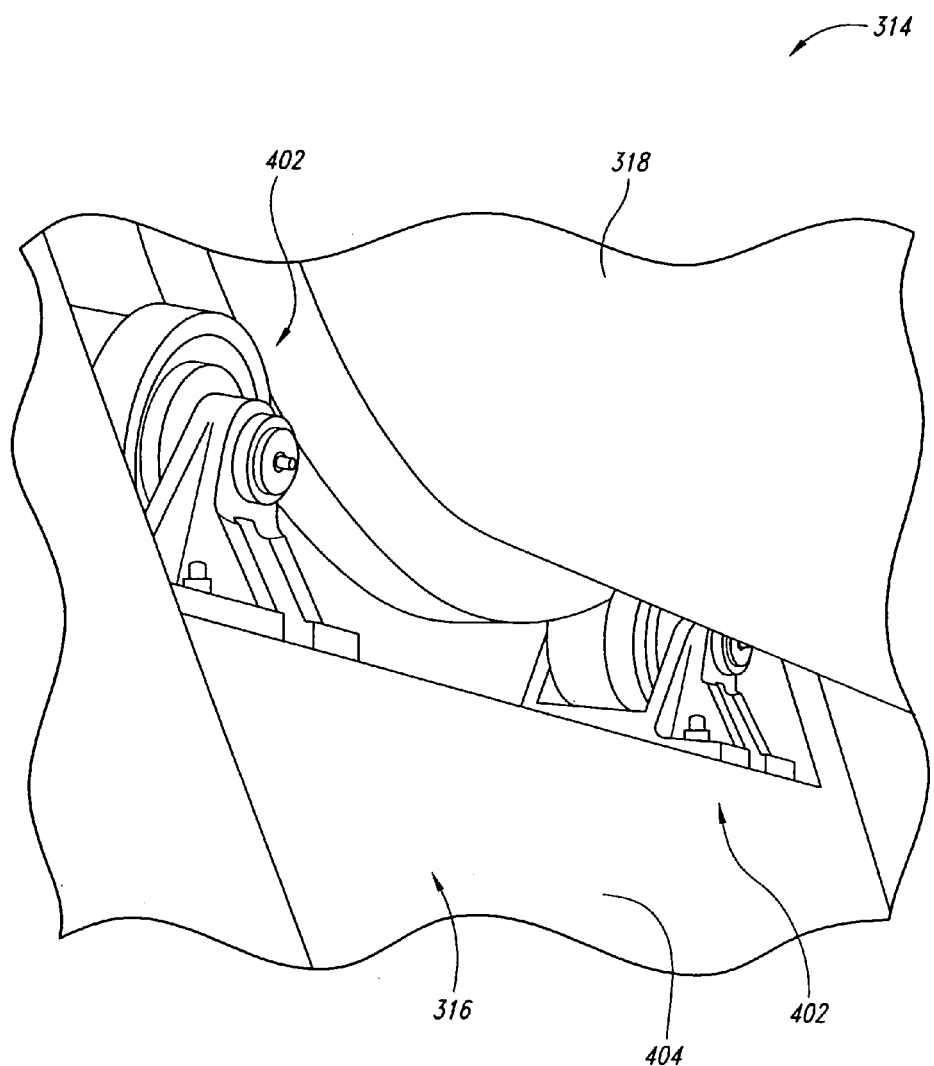
FIG. 4 is an isometric view of a rear portion of the cement mixer truck of FIG. 3, according to an embodiment of the invention.

FIG. 4 is an isometric view of the rear portion 314 of the cement mixer truck 300 of FIG. 3. As illustrated, the rear mounting assembly 316 includes two roller bearing assemblies 402 and a rear pedestal 404. The roller bearing assemblies 402 are removably connected to the rear pedestal 404. The rear pedestal 404 is rigidly mounted to the platform 306 (FIG. 3) and/or the frame 302 (FIG. 3). The roller bearing assemblies 402 support a portion of the weight of the mixing chamber 318 and mixing chamber load (not shown), and facilitate rotation of the mixing chamber 318.

Figure 5:
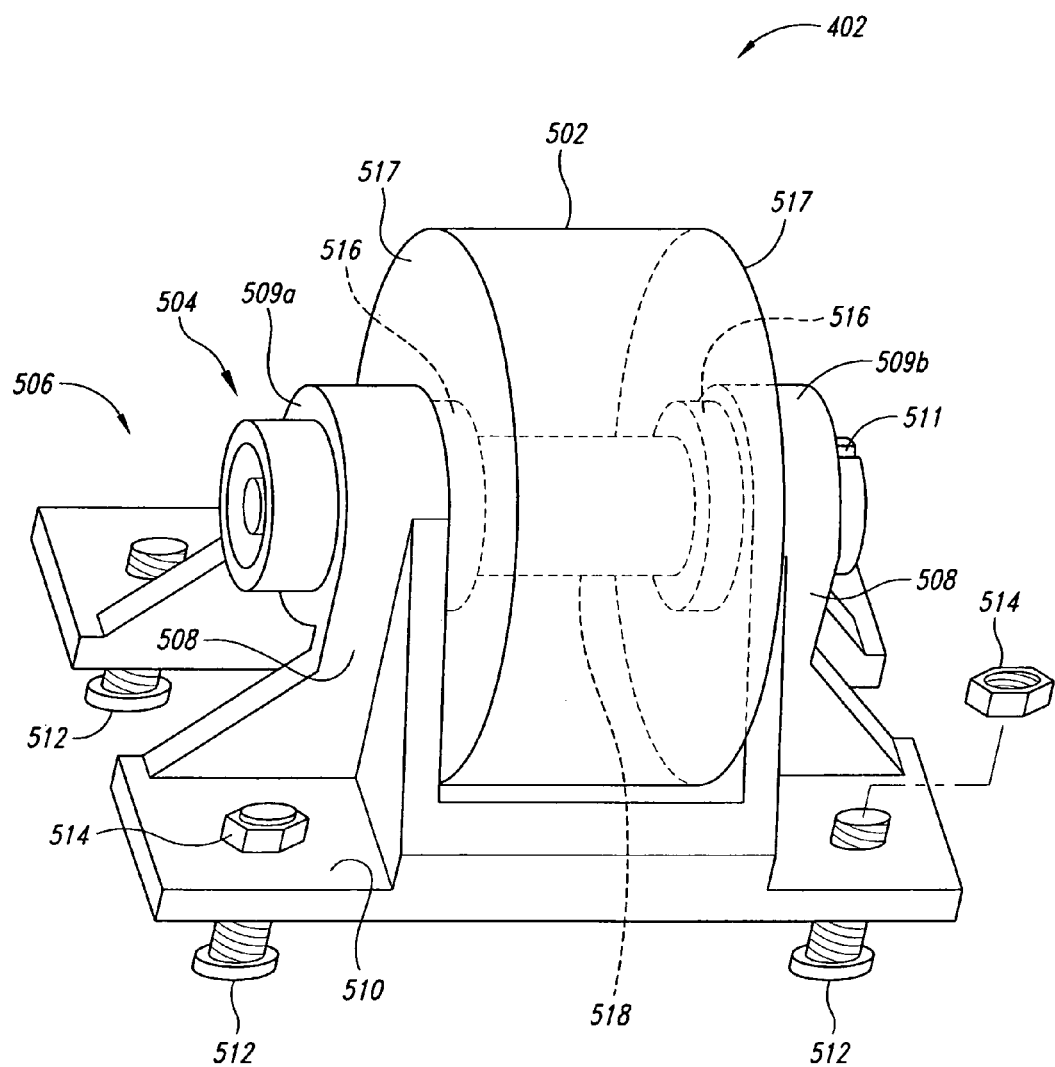
FIG. 5 is an isometric view of a roller bearing assembly of the rear portion of FIG. 4, according to an embodiment of the invention.

FIG. 5 is an isometric view of the roller bearing assembly 402 of FIG. 4, according to an embodiment of the present invention. The roller bearing assembly 402 includes a roller bearing 502, a load cell pin 504 and a pin holder 506. The pin holder 506 includes upper mounting brackets 508 having collars 509, and a lower mounting plate 510. As appreciated by one of skill in the art, the pin holder 506 may be cast as a unitary body, or alternatively, the upper mounting brackets 508 may be welded to the lower mounting plate 510. The lower mounting plate 510 includes a set of openings (not shown) that align with a set of openings (not shown) in the rear pedestal 404 (FIG. 4) for removably connecting the lower mounting plate 510 to the rear pedestal 404. In one embodiment, mounting bolts 512 are positioned through the set of aligned openings in the lower mounting plate 510 and the rear pedestal 404. The mounting bolts 512 receive mounting nuts 514 to removably secure the lower mounting plate 510 to the rear pedestal 404. The scope of the invention covers other means known to one of skill in the art for connecting the pin holder 506 to the rear pedestal 404, including other types of fasteners or weld joints, for example.

As illustrated, the load cell pin 504 is mounted through the collars 509 of the upper brackets 508 of the pin holder 506. In one embodiment, the diameter of the collar 509A is adjustable via a clamping assembly (not shown) to allow the collar diameter to be reduced once the load cell pin 504 is inserted through the collars 509, thus fixedly, but removably securing the load cell pin 504 to the upper brackets 508 of the pin holder 506. In the embodiment as illustrated, the load cell pin 504 includes a key slot 511 that aligns with a key (not shown) permanently connected to an inside edge (not shown) of the collar 509B. An important aspect of an embodiment of the present invention illustrated herein is that the load cell pin 504 is removably mounted to the pin holder 506, thus facilitating conversion of conventional roller bearing assemblies by replacing a conventional roller bearing pin of the known art with the load cell pin 504 of the present invention. Additionally, if a load cell pin is faulty, it may be easily removed and replaced by a new load cell pin 504.

However, the scope of the present invention covers mounting the load cell pin 504 either removably or permanently to the upper brackets 508 by any means known to one of skill in the art. For example, in another embodiment of the present invention, the load cell pin 504 may be fixedly mounted to the collars 509 of the upper brackets 508 by weld joints.

As illustrated, the roller bearing 502 includes an aperture extending along a longitudinal axis of symmetry through which the load cell pin 504 is inserted. Roller bearing sleeves 516 are fixedly connected to walls of the aperture located proximate lateral sides 517 of the roller bearing 502. The roller bearing sleeves 516 facilitate rotation of the roller bearing 502 about a central axis 518 of the load cell pin 504. Each roller bearing 502 is in contact with the mixing chamber 318 (FIG. 4) to facilitate rotation of the mixing chamber 318. The location of the roller bearing sleeves 516 along the central axis 518 will be discussed further below in conjunction with FIG. 6.

Each load cell pin 504 supports a portion of the weight of the mixing chamber 318 and load. The portion of weight supported by each load cell pin 504 depends upon the mass of the mixing chamber 318, the mass of the load contained in the mixing chamber 318, and the location of the center of mass of the mixing chamber 318 and load. The load cell pins 504 include sets of strain gages (not shown) that produce analog electrical signals based upon shear forces applied to the strain gages. The shear forces are generated by the weight of the mixing chamber and load, which is transferred to the strain gages via the roller bearing 502 and roller bearing sleeves 516. The strain gages are disclosed in U.S. Pat. No. 6,118,083, which is incorporated herein by reference. In one embodiment of the present invention, the load cell pin/strain gage assembly may be configured similar to the trunnion/strain gage assembly as disclosed in U.S. Pat. No. 6,118,083.

Figure 6:
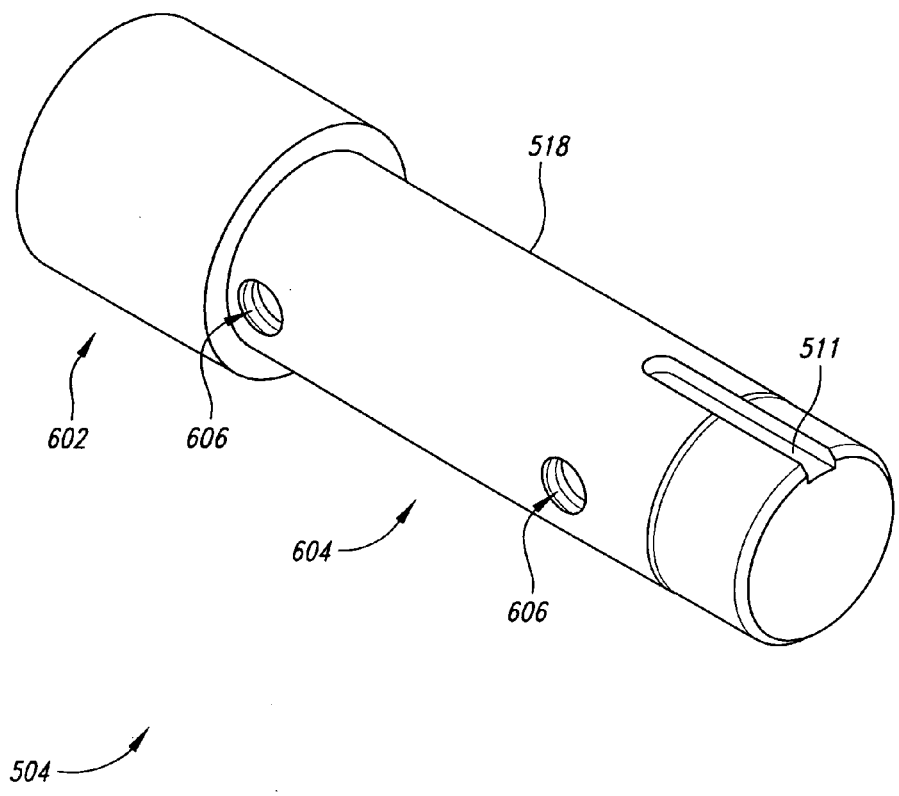
FIG. 6 is an isometric view of a load cell pin of the roller bearing assembly of FIG. 5, according to an embodiment of the invention.

FIG. 6 is an isometric view of the load cell pin 504 of FIG. 5, according to an embodiment of the present invention. The load cell pin 504 includes a collar portion 602 and an axle portion 604. In the embodiment as illustrated, the diameter of the collar portion 602 is larger than the diameter of the axle portion 604. In one embodiment, when the load cell pin 504 is mounted to the pin holder 506 (FIG. 5), the collar 509A (FIG. 5) encloses the collar portion 602, fixedly securing the collar portion 602. The axle portion 604 includes the central axis 518 and the key slot 511. The key slot 511 engages a key (not shown) mounted to an inside surface of the collar 509B (FIG. 5). In the embodiment as illustrated, the axle portion 604 includes two apertures 606 that can extend completely through the load cell pin 504, thereby allowing stress (caused by the weight of the mixing chamber 318 and its load) to be concentrated on inner aperture walls 706, illustrated in FIG. 7B. As illustrated further below in conjunction with FIG. 7B, the inner aperture walls 706 are located proximate to the longitudinal axis of the load pin cell.

As discussed further below in conjunction with FIG. 7B, and more fully in U.S. Pat. No. 6,118,083, at least one strain gage 701 is located on at least one wall 706 of at least one inner aperture 704, preferably along major axes of stress. Referring back to FIG. 5, when the load cell pin 504, roller bearing 502 and pin holder 506 are assembled, the bearing sleeves 516 are positioned circumferentially around the two apertures 606 (FIG. 6) of the load cell pin 504. The bearing sleeves 516 are positioned such as to allow the stress caused by the weight of the mixing chamber 318 (FIG. 3) and load to be transferred to a region of the central axis 518 proximate to the apertures 606, thus allowing the stress to be concentrated on the inner aperture walls and the strain gages 701.

Figure 7A:
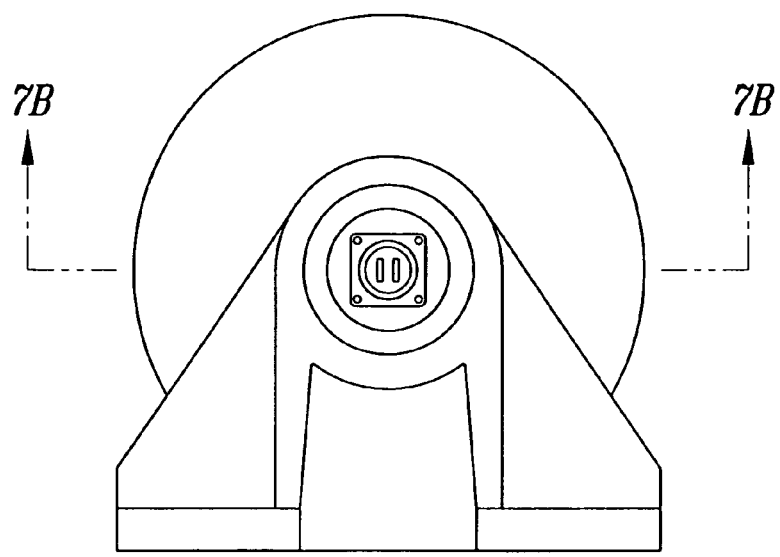
FIG. 7A is an end view of the roller bearing of FIG. 5.
Figure 7B:
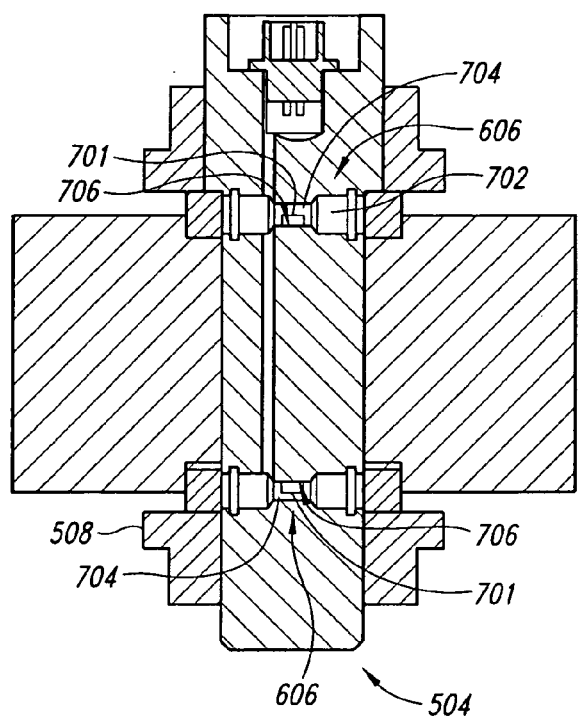
FIG. 7B is a cross-sectional view of the load cell pin of FIG. 6.

FIG. 7A is an end view of the roller bearing assembly 402 of FIG. 5. FIG. 7B is a cross-sectional view of the roller bearing assembly of FIG. 7A. As illustrated, the apertures 606 include an outer aperture portion 702 and an inner aperture portion 704. The inner aperture portion 704 has a diameter that is smaller than a diameter of the outer aperture portion 702, although the scope of the invention covers all combinations of inner and outer aperture portion diameters, including the aperture 606 having a constant diameter (i.e., diameters of the inner and outer aperture portions 704 and 702 being the same). As disclosed in U.S. Pat. No. 6,118,083, particularly FIGS. 4–7, 12 and 14, one or more strain gages 701 are mounted on aperture walls 706 of the inner aperture portion 704. In one embodiment of the invention, two strain gages are mounted on the aperture walls 706 of each inner aperture portion 704.

Figure 8:
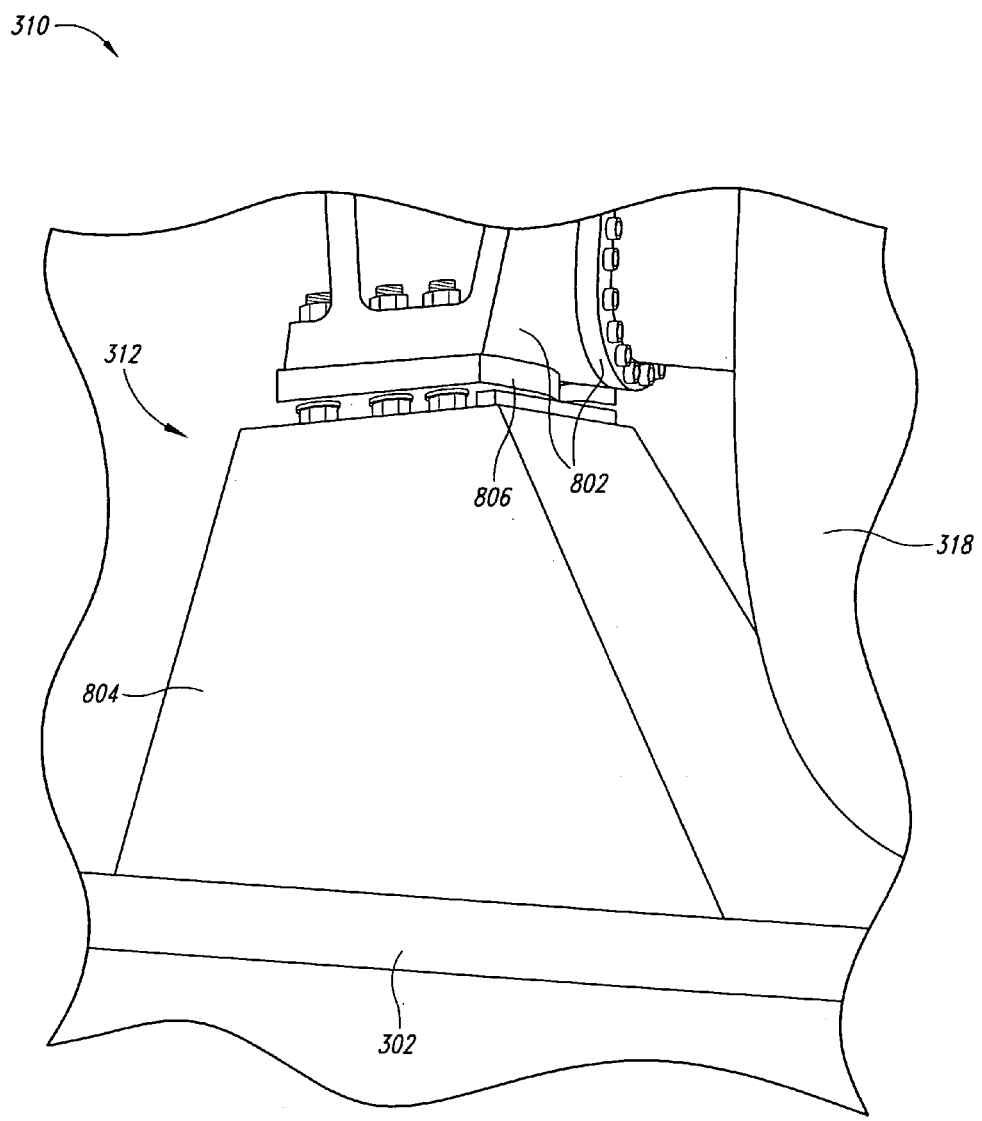
FIG. 8 is an isometric view of the front portion of the cement mixer truck of FIG. 3, according to an embodiment of the invention.

FIG. 8 is an isometric view of the front portion 310 of the cement mixer truck 300 of FIG. 3. As illustrated, the forward mounting assembly 312 includes a mixing chamber engagement device (i.e., a gear assembly) 802 and a front pedestal 804. The engagement device 802 rotatably engages the mixing chamber 318. The forward mounting assembly 312 further includes a load cell plate 806 removably fastened between the engagement device 802 and the pedestal 804.

Figure 9:
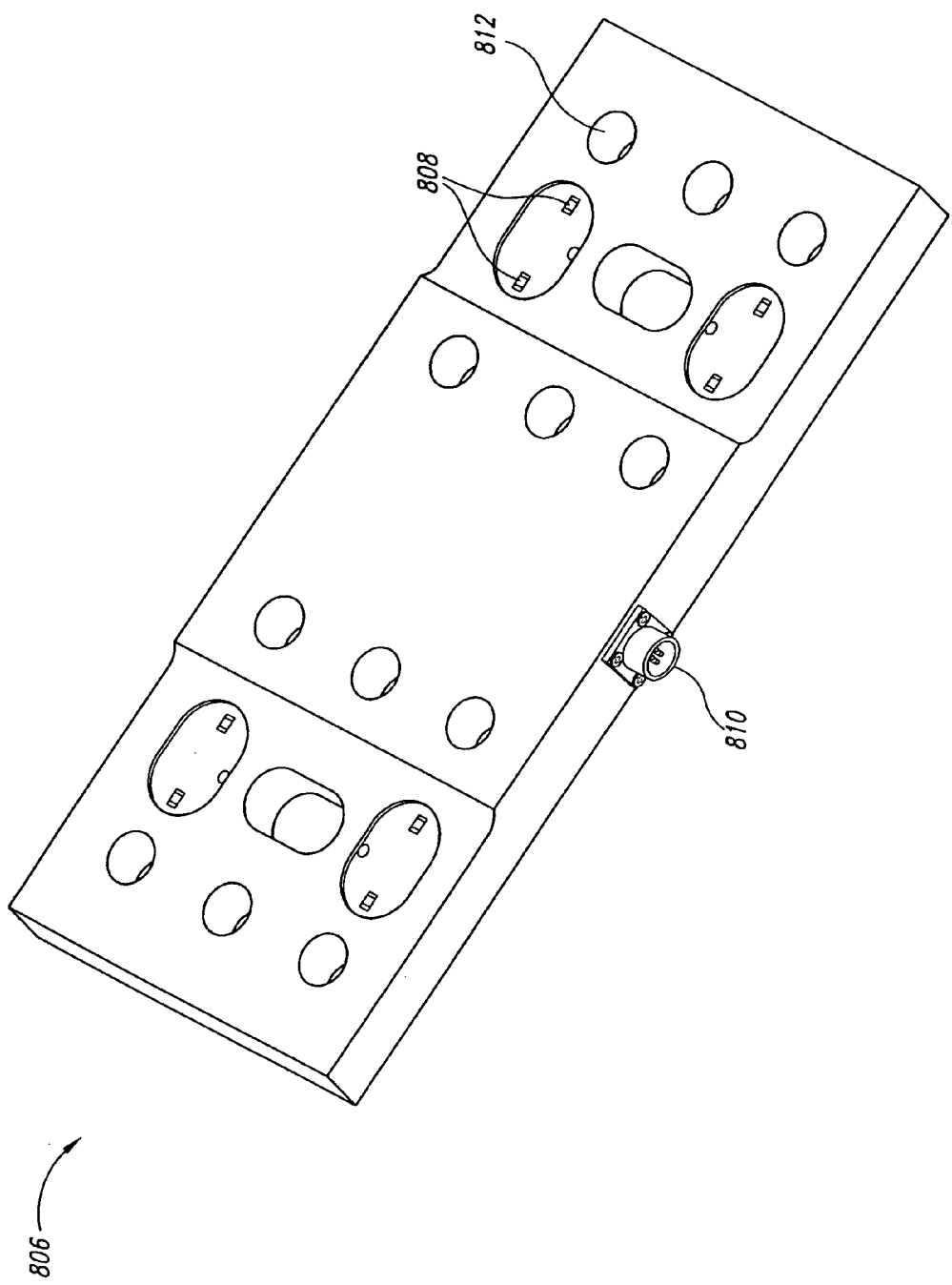
FIG. 9 is an isometric view of a load cell plate of the front portion of FIG. 8, according to an embodiment of the invention.

FIG. 9 is an isometric view of the load cell plate 806 included in the mounting assembly 312 (FIG. 8). In the illustrated embodiment of FIG. 9, the load cell plate 806 includes a plurality of strain gages 808, for example eight strain gages, with two strain gages positioned proximate to each corner of the load cell plate. In operation, a strain difference between each pair of strain gages 808 in all corners can be measured to calculate the load, which may be proportional to the strain difference. An electrical coupling device 810 can transmit this data to a receiver, controller, or decoder, or other data processing or display device. The load cell plate 806 may include a plurality of optional apertures 812 positioned proximate to the strain gages 808 to concentrate the strain toward the strain gages 808. This feature may minimize errors that may arise due to the torsion loads on the load cell plate 806. The illustrated load cell plate 806 is removably fastened to the engagement device 802 (FIG. 8) using fastening means, for example, bolts and nuts.

It will be understood that various embodiments may or may not incorporate one or more of the aforementioned components, or may incorporate a load cell plate 806 of a different shape. For example, the load cell plate 806 may use other coupling means, such as welding, for coupling to the engagement device 802 and/or to the pedestal 804. Additionally, or alternatively, the load cell plate 806 may preclude apertures 812. The shape of the load cell plate 806 may also be different. For example, a load cell pin may be incorporated, similar to the load cell pin 504 (FIG. 5) for the rear mounting assembly 316 (FIG. 3). An individual of ordinary skill in the art, having reviewed this disclosure, will appreciate these and other variations that can be made to the front portion 310 without deviating from the spirit of the invention.

Figure 10:
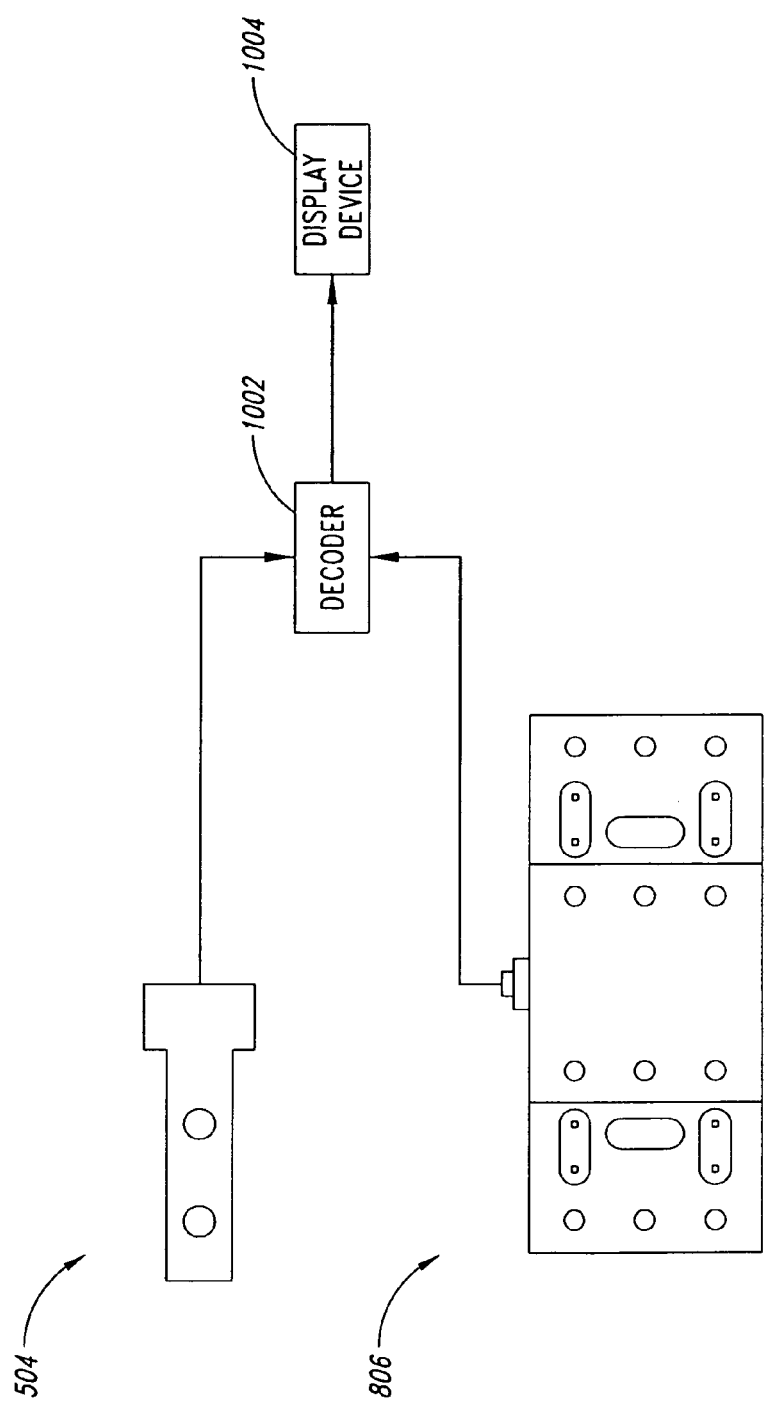
FIG. 10 is a block diagram illustrating a load cell pin and a load cell plate, each electrically coupled to a decoder and a display device.

As disclosed in U.S. Pat. No. 6,118,083, the analog electrical signals generated by each set of strain gages in the load cell pins 504 are transmitted to a decoder 1002, illustrated in FIG. 10. The decoder 1002 produces a digital weight signal and transmits the digital weight signal to a display unit 1004 located in the cab 304 (FIG. 3). The display unit 1004 combines this digital weight signal with a digital weight signal received from the decoder 1002, corresponding to a digital weight signal received from the load cell plate 806, installed as part of the forward mounting assembly 312 (FIG. 3). The display unit 1004 displays either the weight of the load contained in the mixing chamber 318, the weight of the load and mixing chamber 318, or the weight of the cement mixer truck 300 (FIG. 3). In a further embodiment of the invention, the decoder is an LC100S decoder and the display unit is an LM100P onboard digital display meter as produced by CREATIVE MICROSYSTEMS of Renton, Wash.

The system and method for weight measurement according the present invention has been shown to improve the accuracy of calculating the weight of a vehicle, a chamber thereon, or a load within the chamber, or a total weight of all three or of any combination thereof, to within approximately 0.5% of the actual weight, whereas, existing methods can only reach an accuracy of within approximately 10% of the actual weight.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A cement mixer truck, comprising:
   a mixing chamber;
   at least one rear roller bearing assembly including
      a roller bearing configured to rotatably support the mixing chamber, and
      a first weight measurement device coupled to the roller bearing, the first weight measurement device configured to generate a first set of electrical signals corresponding to a load borne by the roller bearing, the load borne by the roller bearing being generated by the mixing chamber; and
   a front mounting assembly including
      an engagement device rotatably coupled to the mixing chamber, and
      a second weight measurement device coupled to the engagement device, the second weight measurement device configured to generate a second set of electrical signals corresponding to a load borne by the engagement device, the load borne by the engagement device being generated by the mixing chamber.

2. The cement mixer truck according to claim 1, wherein the first weight measurement device is a load cell pin.

3. The cement mixer truck according to claim 2, wherein the load cell pin comprises at least one strain gage.

4. The cement mixer truck according to claim 2, wherein the roller bearing is coupled to the load cell pin via at least one bearing sleeve, the roller bearing further configured to axially rotate about the load cell pin.

5. The cement mixer truck according to claim 2, wherein the load cell pin further comprises:
   at least one aperture extending completely through the load cell pin, the aperture having an inner aperture portion bordered by inner aperture walls centered approximately on a longitudinal axis of the load cell pin; and
   two strain gages mounted on the inner aperture walls to generate the first set of electrical signals based upon a shear strain created by the load borne by the roller bearing.

6. The cement mixer truck according to claim 1, further comprising:
   at least one decoder electrically coupled to the first and the second weight measurement devices, the at least one decoder configured to generate a digital signal; and
   a display device electrically coupled to the at least one decoder, the display device configured to receive the digital signal and display a weight of the cement mixer truck.

7. A weight measuring system comprising:
   a chamber having a first end and a second end, and operable to receive, store, and deposit a load;
   an engagement device adapted to rotatably receive the first end of the chamber;
   a first weight measuring device adapted to removably couple to the engagement device and operable to measure a weight of the first end of the chamber;
   a second weight measuring device adapted to rotatably receive the second end of the chamber and operable to measure a weight of the second end of the chamber; and means for electrically coupling the first weight measuring device to the second weight measuring device, and operable to calculate the weight of the load.

8. The weight measuring system of claim 7, wherein the first weight measuring device is a load cell plate having a plurality of strain gages and the second weight measuring device is a load cell pin having at least one strain gage.

9. A method for measuring a weight of a load in a chamber of a vehicle, comprising:

measuring a weight of a first end and a weight of a second end of the chamber;

determining a distance from a fixed reference point to a center of mass of the load, by means of the weight of the first end, the weight of the second end, and an axial distance from the first end and the second end, respectively, to the fixed reference point; and calculating the weight of the load from a cumulative weight of the first end and the second end, and the distance from the fixed reference point to the center of mass of the load.

* * * * *